US011143760B2

(12) United States Patent
Melgangolli et al.

(10) Patent No.: US 11,143,760 B2
(45) Date of Patent: Oct. 12, 2021

(54) OBJECT-DETECTOR CONFIGURATION BASED ON HUMAN-OVERRIDE OF AUTOMATED VEHICLE CONTROL

(71) Applicant: Motional AD LLC, Boston, MA (US)

(72) Inventors: Vasudeva Pai Melgangolli, Pittsburgh, PA (US); Junsung Kim, Pittsburgh, PA (US); Gaurav Bhatia, Pittsburgh, PA (US); Jonathan L. Wieskamp, Santa Clara, CA (US)

(73) Assignee: Motional AD LLC, Boston, MA (US)

( * ) Notice: Subject to any disclaimer, the term of this patent is extended or adjusted under 35 U.S.C. 154(b) by 599 days.

(21) Appl. No.: 15/906,059

(22) Filed: Feb. 27, 2018

(65) Prior Publication Data
US 2019/0257951 A1 Aug. 22, 2019

Related U.S. Application Data

(60) Provisional application No. 62/632,143, filed on Feb. 19, 2018.

(51) Int. Cl.
*G01C 22/00* (2006.01)
*G05D 1/00* (2006.01)
(Continued)

(52) U.S. Cl.
CPC ............ *G01S 17/931* (2020.01); *G01S 17/04* (2020.01); *G05D 1/0061* (2013.01);
(Continued)

(58) Field of Classification Search
CPC ........ G01S 17/89; G01S 17/04; G01S 17/931; G05D 1/0061; G05D 1/0088; G05D 1/0274; G05D 1/0238
(Continued)

(56) References Cited

U.S. PATENT DOCUMENTS

2015/0310281 A1 10/2015 Zhu et al.
2016/0231746 A1 8/2016 Hazelton et al.
(Continued)

FOREIGN PATENT DOCUMENTS

CN 107472359 12/2017
DE 102017115988 1/2019
(Continued)

OTHER PUBLICATIONS

IP.com Search.*
Danish Search Opinion in Danish Application No. PA201870719, dated Jan. 21, 2019, 7 pages.

*Primary Examiner* — Mahmoud S Ismail
(74) *Attorney, Agent, or Firm* — Fish & Richardson P.C.

(57) ABSTRACT

A vehicle control system includes an object-detector, a location-detector, a configuration-map, and a controller-circuit. The object-detector is configured to detect objects proximate to a host-vehicle. The location-detector is configured to indicate a location of the host-vehicle. The configuration-map is configured to indicate a configuration of the object-detector for the location of the host-vehicle when the host-vehicle is operated in an automated-mode. The controller-circuit is in communication with the location-detector, the configuration-map, and the object-detector. The controller-circuit is configured to operate the object-detector in accordance with the configuration for the location of the host-vehicle when the host-vehicle is operated in an automated-mode, detect a human-override of the automated-mode at the location, and update the configuration-map for the location in accordance with objects detected and in response to the human-override of the automated-mode.

20 Claims, 3 Drawing Sheets

(51) Int. Cl.
    *G01S 17/931*     (2020.01)
    *G05D 1/02*     (2020.01)
    *G01S 17/04*     (2020.01)

(52) U.S. Cl.
    CPC ......... *G05D 1/0088* (2013.01); *G05D 1/0274* (2013.01); *G05D 1/0238* (2013.01)

(58) Field of Classification Search
    USPC .......................................................... 701/23
    See application file for complete search history.

(56) References Cited

U.S. PATENT DOCUMENTS

| | | | |
|---|---|---|---|
| 2016/0252903 A1 | 9/2016 | Prokhorov | |
| 2017/0098131 A1 | 4/2017 | Shashua et al. | |
| 2017/0255199 A1* | 9/2017 | Boehmke | G01S 7/4972 |
| 2017/0287331 A1 | 10/2017 | Laur et al. | |
| 2017/0357267 A1* | 12/2017 | Foster | A01B 69/008 |
| 2018/0218224 A1* | 8/2018 | Olmstead | G07G 1/0045 |
| 2020/0064138 A1* | 2/2020 | Takahama | G01C 21/28 |
| 2020/0158517 A1* | 5/2020 | Tadi | G01C 21/32 |

FOREIGN PATENT DOCUMENTS

| | | |
|---|---|---|
| DE | 102017212607 | 1/2019 |
| DE | 102017212908 | 1/2019 |
| WO | WO 2017/172034 | 10/2017 |

* cited by examiner

OBJECT-DETECTOR CONFIGURATION BASED ON HUMAN-OVERRIDE OF AUTOMATED VEHICLE CONTROL

TECHNICAL FIELD OF INVENTION

This disclosure generally relates to a vehicle control system, and more particularly relates to a system that updates a configuration-map for a specific location of an object-detector, and does the update in response to the human-override of an automated-mode operation of a vehicle.

BRIEF DESCRIPTION OF DRAWINGS

The present invention will now be described, by way of example with reference to the accompanying drawings, in which.

DETAILED DESCRIPTION

It has been observed that at certain locations an object-detector of an automated vehicle should be configured differently from a factory default configuration to better detect objects at/near the location.

Figure 1:
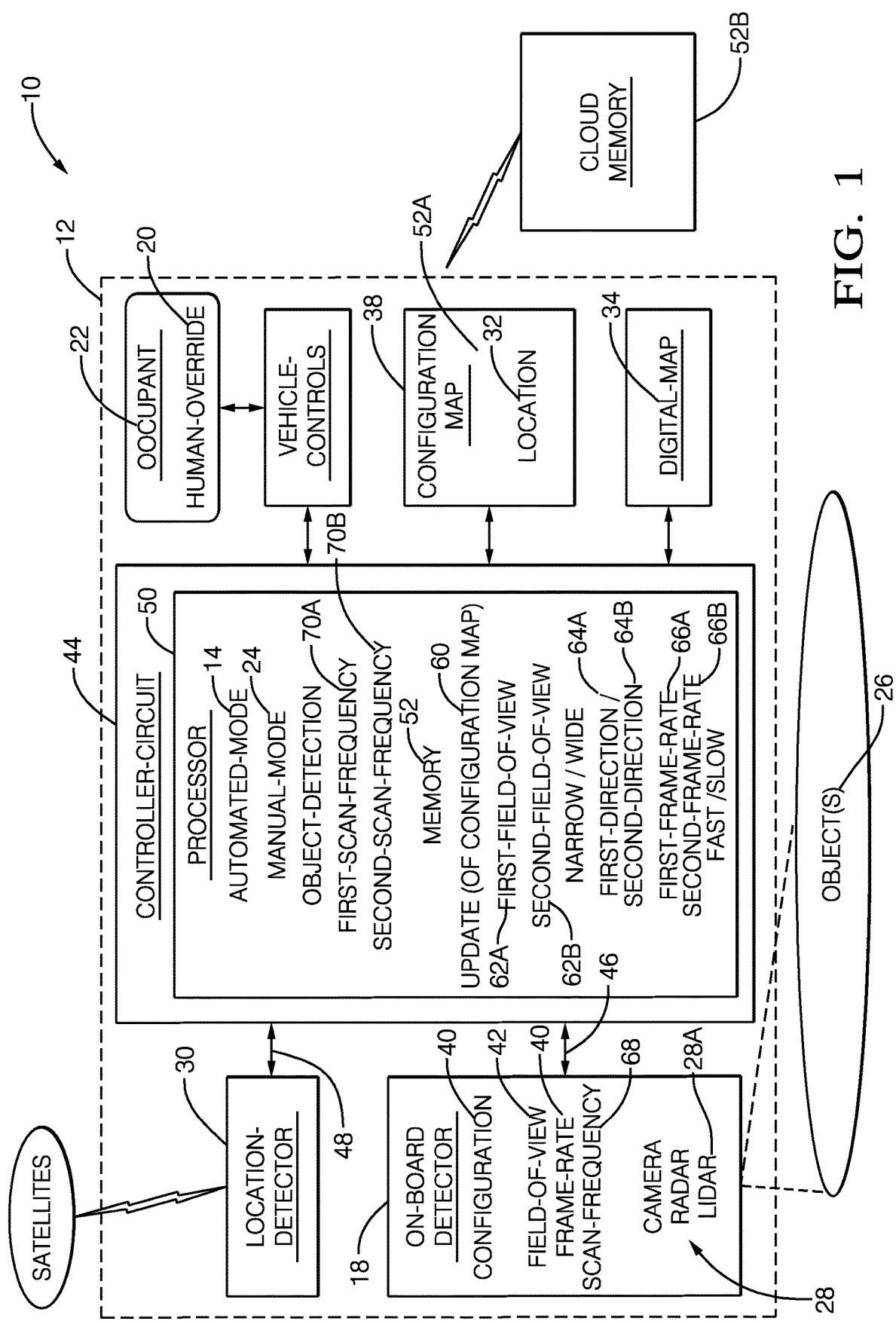
FIG. 1 is diagram of a vehicle control system in accordance with one embodiment.

FIG. 1 illustrates a non-limiting example of a vehicle control system 10, hereafter referred to as the system 10, that selectively operates a host-vehicle 12 in an automated-mode 14, and updates or revises a configuration 16 of an object-detector 18 if/when a human-override 20 of the automated-mode 14 is caused or executed by an occupant 22 of the host-vehicle 12. The host-vehicle 12 may be characterized as an automated vehicle. As used herein, the term automated vehicle may apply to instances when the host-vehicle 12 is being operated in the automated-mode 14, i.e. a fully autonomous mode, where a human-operator (the occupant 22) of the host-vehicle 12 may do little more than designate a destination to operate the host-vehicle 12. However, full automation is not a requirement. It is contemplated that the teachings presented herein are useful when the host-vehicle 12 is operated in a manual-mode 24 where the degree or level of automation may be little more than providing an audible or visual warning to the occupant 22 who is generally in control of the steering, accelerator, and brakes of the host-vehicle 12. For example, the system 10 may merely assist the occupant 22 as needed to change lanes and/or avoid interference with and/or a collision with, for example, an object such as another-vehicle, a pedestrian, or a road sign.

A mentioned above, the system 10 includes an object-detector 18 mounted on the host-vehicle 12. The object-detector 18 is generally configured to detect instances of objects 26 (e.g. pedestrians, other-vehicles, construction-equipment, or construction-workers) proximate to (e.g. within 100 meters of) the host-vehicle 12. The object-detector 18 may consist of or include, but is not limited to, one or more instances of a camera (IR or visible or both), radar unit, lidar unit, ultrasonic transducer, inertial measurement unit (IMU), or any combination thereof. The device(s) 28 or units that form the object-detector 18 may be co-located in a unified housing, or distributed at different advantageous locations about the host-vehicle 12. For example, the object-detector 18 may include multiple cameras so a 360° image about the host-vehicle 12 can be rendered, i.e. synthesized.

The system 10 also includes a location-detector 30 (e.g. a global-positioning-system-receiver or GPS-receiver) configured to indicate coordinates which correspond to a location 32 of the host-vehicle 12 on a digital-map 34. By way of example, the location 32 may be specified as coordinates (e.g. latitude, longitude, elevation; based on signals from satellites) that the digital-map 34 may indicate corresponds to a roadway 36 (FIG. 2) traveled by the host-vehicle 12. The digital-map 34 may be stored on-vehicle and/or in-the-cloud, and could be shared with other vehicles.

The system 10 also includes a configuration-map 38 configured to indicate or specify the configuration 16 of the object-detector 18 for the location of object-detector 18 or the host-vehicle 12. That is, the configuration-map 38 indicates the configuration 16 to be used to configure the object-detector 18 based on or in accordance with the present location of the object-detector 18 or the host-vehicle 12. It is contemplated that the configuration-map 38 may specify the same or different configurations for the object-detector 18 when the host-vehicle 12 is operated in the automated-mode 14 versus the manual-mode 24. The configuration 16 for the location 32 may specify, for example but not limited to: a frame-rate 42; a field-of-view 40; a scan-frequency 68; a resolution, an area of interest within an image, radar-map, or point-cloud; a zoom-setting of the camera; a variable point-cloud density; maximum/minimum range of lidar or radar; narrow/wide view; and/or an emitted signal strength of the radar or the lidar.

By way of example and not limitation, the radar may be configured to operate in a narrow-view/long-range mode when the location 32 corresponds to an expressway, highway, or freeway where the host-vehicle 12 is traveling at a relatively high speed; and a wide-view/short-range mode when the location 32 corresponds to an urban area and the host-vehicle 12 is traveling at a relatively low speed. It is noted that it may not be advantageous to operate the radar always in a wide-view/long-range mode as too much information may be gathered for efficient processing and/or the information gathered may have excessive noise, e.g. false targets. That is, there is generally an optimum configuration for the object-detector 18 that is influenced or based on the local environment being observed by the object-detector 18. The system 10 may initially use a factory or default-configuration unless a custom-configuration has been previously established because of a prior visit to a specific instance of the location 32, or a recommended-configuration for the location 32 was received from another vehicle that previously traveled through the specific instance of the location 32.

The system 10 also includes a controller-circuit 44 in communication with the object-detector 18 via a first-connection 46, the location-detector 30 via a second-connection 48, and the configuration-map 38. The first-connection 46 and the second-connection 48 may be by way of wires, optical-fiber, or a wireless-connection. The controller-circuit 44, hereafter sometimes referred to as the controller 44, may include a processor 50 such as one or more instances of a microprocessor or other control circuitry such as analog and/or digital control circuitry including an application specific integrated circuit (ASIC) for processing data as should be evident to those in the art. Hereafter, any reference to the controller 44 being configured for something is to also be interpreted as suggesting that the processor 50 may also be configured for the same thing. The controller 44 may include memory 52, i.e. non-transitory computer-readable storage-medium, including non-volatile memory, such as electrically erasable programmable read-only memory (EEPROM) for storing one or more routines, thresholds, and captured data. The memory 52 may be part of the processor 50, or part of the controller 44, or separate from the controller 44 such as on-board-memory 52A or remote memory, i.e. cloud-memory 52B stored in the cloud. The one or more routines may be executed by the controller 44 or the processor 50 to perform steps for operating the host-vehicle 12 based on signals received by the controller 44 from, but not limited to, the object-detector 18, the location-detector 30, and the configuration-map 38.

The configuration-map 38 may be stored in the memory 52, or in the on-board-memory 52A, or in the cloud-memory 52B, or partially stored in any combination thereof. For example, the configuration-map 38 stored in the on-board-memory 52A may only cover an area within, for example, one-hundred-kilometers (100 km) of the location 32 of the host-vehicle 12, and the remainder of the configuration-map 38 may be stored in the cloud-memory 52B and accessed as needed. Accordingly, the controller 44 may include a transceiver (not shown) used to communicate with or access the cloud-memory 52B by way of, for example, dedicated-short-range-communications (DSRC), Wi-Fi communication, or cellular-phone-network communications. The controller-circuit 44 is configured to (e.g. programmed to or designed to) operate the object-detector 18 in accordance with the configuration 16 (e.g. the default configuration or previously established custom-configuration) for the location 32 of the host-vehicle 12 or the object-detector 18. Processing of perception-data from the object-detector 18 may be performed by the controller 44 (i.e. the processor 50), or an image/data-processor (not shown) within the object-detector 18, or a separate image/data-processor (not shown) within the controller 44.

The controller 44 is also configured to, detect a human-override 20 of the automated-mode at the location 32 when the host-vehicle 12 is operated in the automated-mode 14. By way of example and not limitation, the human-override 20 that is detected by the controller 44 while the host-vehicle 12 is being operated in the automated-mode 14 may be or may include: an application of vehicle-brakes (by the occupant 22), manual operation of a hand-wheel (i.e. steering-wheel), operating a button or switch to disengage the automated-mode 14, and/or issuing verbal command by the occupant 22 to disengage the automated-mode 14.

The system 10 generally operates under an assumption that an instance of the occupant 22 performing a human-override 20 is an indication that the configuration 16 of the object-detector 18 for the location 32 was somehow deficient to detect the objects 26. In response to the human-override 20 of the automated-mode 14, the controller-circuit 44 is configured to update the configuration-map 38 for the location in accordance with objects 26 detected by the object-detector 18 at the instant of and/or after the human-override 20. That is, the controller 44 is configured to modify default-configuration or further modify a previously established custom-configuration stored in the configuration-map 38 for the location 32. By way of example, the object-detector 18 may be temporarily reconfigured to operate at maximum sensitivity/range to detect and make a record the objects 26 detected by the object-detector 18 the occupant 22 initiates the human-override 20 of the automated-mode 14, and update the configuration 16 for the location 32 in a manner intended to increase likelihood that instances of the objects 26 that were not detected or accurately classified (which presumably caused the human-override 20) will be detected earlier and/or accurately classified the next time the host-vehicle 12 travels to/through the location 32.

Figure 2:
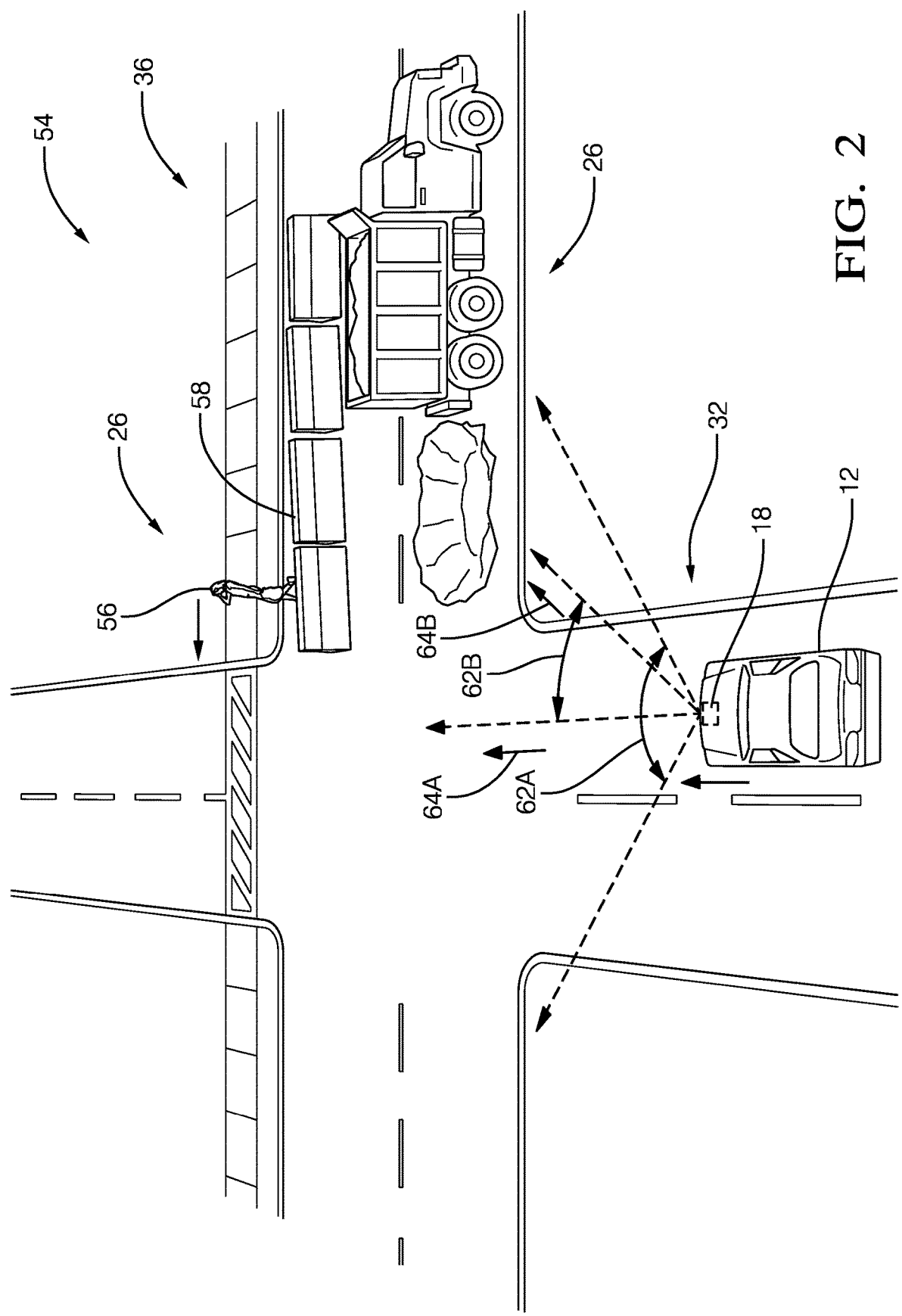
FIG. 2 is a scenario encountered by the system of FIG. 1 in accordance with one embodiment.

FIG. 2 illustrates a non-limiting example of a scenario 54 where the host-vehicle 12 is traveling a roadway 36 and approaching a construction-zone that includes multiple instances of the objects 26, some of which may not be detected and/or accurately classified if the configuration 16 for the location 32 were established prior to construction starting at the construction-zone. That is, the configuration 16 stored in the configuration-map 38 for the location 32 may be a factory default-configuration because the host-vehicle 12 has never previously been to the location 32, or the configuration 16 may be a previously established custom-configuration stored in the configuration-map 38 for the location 32 because on a prior visit to the location the occupant 22 initiated a human-override 20.

In this non-limiting example, the line-of-sight from the object-detector 18 on the host-vehicle 12 to a pedestrian 56 is partially blocked by a construction-barrier 58. If the configuration 16 were established before construction started, e.g. there were no instances of the construction-barrier 58 in the objects 26 when the location 32 was previously visited, the object-detector 18 may not be able to detect or properly classify an instance of the objects 26, the instance being the pedestrian 56. The occupant 22 in the host-vehicle 12 may see the pedestrian 56 approaching the roadway 36 in a direction that will cross the travel-path of the host-vehicle 12, so the occupant 22 may apply the brakes of the host-vehicle 12, thereby initiating a human-override 20. In response to the human-override 20, the controller 44 may record data collected by the object-detector 18 so the data can later be back-searched for the cause of the human-override 20 and change the configuration of the object-detector 18 so that what caused the human-override 20 might be detected and classified the next time the host-vehicle 12 travels to/through the location 32. Non-limiting examples of how an update 60 to the configuration 16 for the location 32 can be determined and saved in the configuration-map 38 for future use are described below.

In one embodiment of the system 10, the object-detector includes a device 28 (e.g. camera, lidar, or radar) characterized as having a variable field-of-view 40. The configuration-map 38 may specify a first-field-of-view 62A for the location 32 to operate the device 28 prior to the human-override 20. The update 60 to the configuration-map 38 may specify a second-field-of-view 62B to operate the device 28 that is different (wider/narrower, or centered on a different direction) from the first-field-of view 62A in response to the human-override 20 of the automated-mode 14. Thus, the system 10 may use a different field-of-view for the next visit to the location 32.

In the non-limiting example shown in FIG. 2, the first-field-of-view 62A is characterized as wider than the second-field-of-view 62B. Alternatively, or additionally, the first-field-of-view 62A may be characterized as being directed in a first-direction 64A, and the second-field-of-view 62B is characterized as being directed in a second-direction 64B different from the first direction 64A. Using the second-field-of-view 62B, which is narrower and/or centered on a different direction than the first-field-of-view 62A may reduce the overall amount of data collected by the object-detector 18, but the data collected may be more relevant or useful, so can be more toughly analyzed to detect and characterized instances of the objects 26 that may be the cause of the human-override 20.

In another embodiment of the system 10, the object-detector includes a device 28 (e.g. camera or radar) characterized as having variable frame-rate 42. The configuration-map 38 may specify a first-frame-rate 66A to operate the device 28 prior to the human-override 20, and the update 60 to the configuration-map 38 to specify a second-frame-rate 66B to operate the device 28 that is different from the first-frame-rate 66A, where the update 60 is in response to the human-override 20 of the automated-mode 14. That is, the configuration-map 38 may be updated to use a different frame-rate (faster or slower) for the next visit to the location 32. By way of example, the first-frame-rate 66A may be characterized as less than (i.e. slower than) the second-frame-rate 66B. By increasing the frame rate of the camera and/or radar, more data may be gathered by the object-detector 18 which may allow for earlier detection of the pedestrian 56 even though a portion of the pedestrian 56 is hidden from view by the construction-barrier 58.

In another embodiment, the object-detector 18 includes a light-detection-and-ranging-device 28A (lidar 28A) characterized as having a variable scan-frequency 68. The lidar 28A can be operated at different scan-frequencies to have the internal laser sensor to scan faster resulting in less resolution or scan slower resulting in greater resolution. Whenever we have interested area of disengagement, some lidars can be configured to spin a deflection mirror slower which provides for an increased density point cloud from the sensor which helps to detect more objects. For example, the configuration-map 38 specifies a first-scan-frequency 70A (e.g. 25 Hz) to operate the lidar 28A prior to the human-override 20. The update 60 to the configuration-map 38 specifies a second-scan-frequency 70B (e.g. 12.5 Hz) to operate the lidar 28A different from the first-scan-frequency 70A in response to the human-override 20 of the automated-mode 14. In this example, the first-scan-frequency 70A is characterized as greater than the second-scan-frequency 70B.

Figure 3:
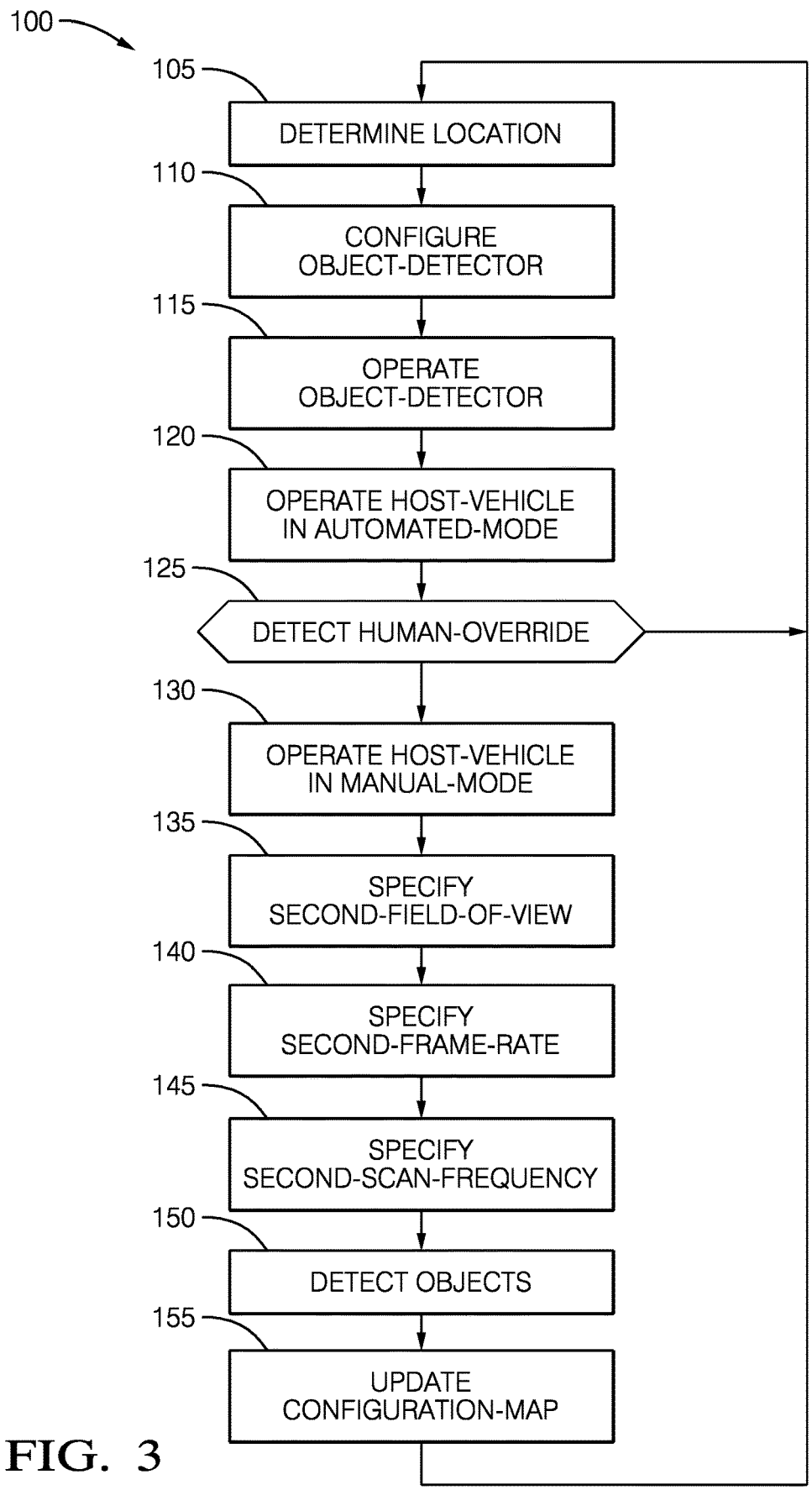
FIG. 3 is a method of operating the system of FIG. 1 in accordance with one embodiment.

FIG. 3 illustrates a non-limiting example of a method 100 of operating the vehicle control system 10.

Step 105, DETERMINE LOCATION, may include determining a location 32 of a host-vehicle on a digital-map 34 based on coordinates of the host-vehicle 12 (or the object-detector 18) provided by the location-detector 30. The location 32 may also be used to determine the configuration 16 (e.g. the field-of-view 40 and/or the frame-rate 42) for the object-detector 18 based on information from the configuration-map 38.

Step 110, CONFIGURE OBJECT-DETECTOR, may include adjusting the configuration 16 of the device 28 of the object-detector 18 (e.g. adjusting the field-of-view 40 and/or the frame-rate 42) based on information from the configuration-map 38 for the location 32 of the host-vehicle 12. For example, the field-of-view 40 of the object-detector 18 may be set to the first-field-of-view 62A (e.g. 90° view angle), and/or the first-direction 64A (e.g. aligned with longitudinal axis, i.e. direction of travel, of the host-vehicle 12), and/or the frame-rate 42 may be set to the first-frame-rate 66A (e.g. ten frames per second).

Step 115, OPERATE OBJECT-DETECTOR, may include operating an object-detector 18 to detect instances of the objects 26 proximate to a host-vehicle 12 in accordance with the configuration 16 specified by the configuration-map 38.

Step 120, OPERATE HOST-VEHICLE IN AUTOMATED-MODE, may include the controller 44 or the processor 50 operating the steering and/or brakes and or accelerator of the host-vehicle 12 to control the motion of the host-vehicle 12.

Step 125, DETECT HUMAN-OVERRIDE, may include detecting an instance of the occupant 22 operating one or more of the vehicle controls, e.g. pressing the brake-pedal or accelerator-pedal, and/or operating the hand-wheel of the host-vehicle 12, as an indication of a human-override 20 of the automated-mode 14 at the location 32.

Step 130, OPERATE HOST-VEHICLE IN MANUAL-MODE, may include the controller 44 (and the processor 50) generally ceasing to operate the steering, brakes, and accelerator of the host-vehicle 12 leaving the control of those functions to the occupant 22. However, it is contemplated that certain safety/collision avoidance functions that may momentarily operate the steering, brakes, and/or accelerator to avoid a collision would still be enabled.

Step 135, SPECIFY SECOND-FIELD-OF-VIEW, may include specifying or determining a second-field-of-view 62B to operate the device, where the second-field-of-view 62B different from a first-field-of view 62A. For example, the field-of-view 40 of the object-detector 18 may be set to the second-field-of-view 62B, e.g. 35° view angle, and/or the second-direction 64BA, e.g. centered on instances of the objects that are relatively close to the travel-path of the host-vehicle 12.

Step 140, SPECIFY SECOND-FRAME-RATE, may include specifying a second-frame-rate to operate the device different from a first-frame-rate. For example, the frame-rate 42 may be set to the second-frame-rate 66B which may be twenty frames per second.

Step 145, SPECIFY SECOND-SCAN-FREQUENCY, may include specifying a second-scan-frequency 70B to operate the lidar 28A different from a first-scan-frequency 70A. For example, the first-scan-frequency 70A may be 25 Hertz, and the second-scan-frequency 70B may be 12.5 Hertz.

Step 150, DETECT OBJECTS, may include the controller 44 recording perception-data from the object-detector 18 so a more detailed backward-analysis of the perception-data can be performed to detect/classify any instances of the objects 28 that were not initially detected or classified. This assumes that the occupant 22 perceived some problem with the operation of the host-vehicle 12 in the automated-mode 14 and felt the need to perform the human-override 20.

Step 155, UPDATE CONFIGURATION-MAP, may include updating the configuration-map 38 for the location 32 in accordance with objects 28 detected and in response to detecting the human-override 20 of the automated-mode 14. If the backward-analysis of the perception-data revealed an instance of the objects 28, e.g. the pedestrian 56, that was not previously detected or classified, and it is expected that a different configuration (e.g. the second-field-of-view 62B and/or the second-direction 64, and/or the second-frame-rate 66B) would have detected/classified the pedestrian 56, then the configuration-map 38 for the location 32 may be updated so the pedestrian 56 is detected/classified the next time the host-vehicle 12 travels to/through the location 32.

Described herein is a first device 44 that includes one or more processors 50, memory 52, and one or more programs 100 stored in memory 52. The one or more programs include instructions for performing all or part of the method 100. Also, described herein is a non-transitory computer-readable storage-medium 52 that includes one or more programs 100 for execution by one or more processors 50 of a first device 44. The one or more programs including instructions which, when executed by the one or more processors, cause the first device 44 to perform all or part of the method 100.

Accordingly, a vehicle control system (the system 10), a controller 44 for the system 10, and a method 100 of operating the system 10 are provided.

While this invention has been described in terms of the preferred embodiments thereof, it is not intended to be so limited, but rather only to the extent set forth in the claims that follow.

We claim:

1. A vehicle control system, the system comprising:
an object-detector configured to detect objects proximate to a host-vehicle, the object-detector including a light-detection-and-ranging-device (LIDAR) characterized as having a variable scan-frequency;
a location-detector configured to indicate a location of the host-vehicle;
a configuration-map configured to indicate, from among a plurality of configurations available for the object-detector, a particular configuration applicable to the object-detector for a current location of the object-detector, the particular configuration specifying a first value of the scan-frequency to operate the LIDAR; and
a controller-circuit in communication with the object-detector, the location-detector, and the configuration-map, the controller-circuit configured to:
operate the object-detector in accordance with the particular configuration for the current location of the object-detector in an automated-mode of operating the host-vehicle,
detect a human-override of the automated-mode of operating the host-vehicle at the current location, and
in response to the human-override of the automated-mode, update the particular configuration applicable to the object-detector for the current location in accordance with objects detected at the current location, wherein updating the particular configuration comprises providing a second value of the scan-frequency to operate the LIDAR differently in response to the human-override of the automated-mode.

2. The system in accordance with claim 1, wherein the object-detector includes a device characterized as having at least one parameter that includes a variable field-of-view, the particular configuration in the configuration-map specifies a first value for the field-of-view to operate the device prior to the human-override, and the update to the particular configuration provides a second value for the field-of-view to operate the device differently in response to the human-override of the automated-mode.

3. The system in accordance with claim 2, wherein the first value of the field-of-view is characterized as narrower than the second value of the field-of-view.

4. The system in accordance with claim 2, wherein the first value of the field-of-view is characterized being directed in a first direction, and the second value of the field-of-view is characterized as being directed in a second direction different from the first direction.

5. The system in accordance with claim 1, wherein the object-detector includes a device characterized as having at least one parameter that includes a variable frame-rate, the particular configuration in the configuration-map specifies a first value of the frame-rate to operate the device prior to the human-override, and the update to the particular configuration provides a second value of the frame-rate to operate the device differently in response to the human-override of the automated-mode.

6. The system in accordance with claim 5, wherein the first value of the frame-rate is characterized as less than the second value of the frame-rate.

7. The system in accordance with claim 1, wherein the first value of the scan-frequency is characterized as greater than the second value of the scan-frequency.

8. A controller-circuit for a vehicle control system, the controller-circuit comprising:
a first-connection for connecting to an object-detector configured to detect objects proximate to a host-vehicle, the object-detector including a light-detection-and-ranging-device (LIDAR) characterized as having a variable scan-frequency;
a second-connection for connecting to a location-detector configured to indicate a location of the host-vehicle on a digital-map;
a memory for storing a configuration-map configured to indicate, from among a plurality of configurations available for the object detector, a particular configuration applicable to the object-detector for a current location of the host-vehicle when the host-vehicle is operated in an automated-mode, the particular configuration specifying a first value of the scan-frequency to operate the LIDAR; and
a processor in communication with the location-detector, the configuration-map, and the object-detector, the processor configured to:
operate the object-detector in accordance with the particular configuration for the current location of the host-vehicle in the automated-mode of operating the host-vehicle,
detect a human-override of the automated-mode of operating the host-vehicle at the current location, and
in response to the human-override of the automated-mode, update the particular configuration applicable to the object-detector for the current location in accordance with objects detected at the current location, wherein updating the particular configuration comprises providing a second value of the scan-frequency to operate the LIDAR differently in response to the human-override of the automated-mode.

9. The controller-circuit in accordance with claim 8, wherein the object-detector includes a device characterized as having at least one parameter that includes a variable field-of-view, the particular configuration in the configuration-map specifies a first value for the field-of-view to operate the device prior to the human-override, and the update to the particular configuration provides a second value for the field-of-view to operate the device differently after the human-override of the automated-mode.

10. The controller-circuit in accordance with claim 9, wherein the first value of the field-of-view is characterized as narrower than the second value of the field-of-view.

11. The controller-circuit in accordance with claim 9, wherein the first value of the field-of-view is characterized being directed in a first direction, and the second value of the field-of-view is characterized as being directed in a second direction different from the first direction.

12. The controller-circuit in accordance with claim 8, wherein the object-detector includes a device characterized as having at least one parameter that includes a variable frame-rate, the particular configuration in the configuration-map specifies a first value of the frame-rate to operate the device prior to the human-override, and the update to the particular configuration provides a second value of the frame-rate to operate the device differently after the human-override of the automated-mode.

13. The controller-circuit in accordance with claim 12, wherein the first value of the frame-rate is characterized as less than the second value of the frame-rate.

14. A method of operating a vehicle control system, the method comprising:
    operating a host-vehicle in an automated-mode;
    determining a current location of a host-vehicle on a digital-map;
    operating an object-detector to detect objects proximate to a host-vehicle in accordance with a particular configuration of the object-detector specified by a configuration-map, the object-detector including a light-detection-and-ranging-device (LIDAR) characterized as having a variable scan-frequency, the configuration-map configured to indicate, from among a plurality of configurations available for the obj ect-detector, the particular configuration applicable to the current location of the object-detector and specifying a first value of the scan-frequency to operate the LIDAR; and
    detecting a human-override of the automated-mode at the current location; and
    in response to the human-override of the automated-mode, updating the particular configuration applicable to the object-detector for the current location in accordance with objects detected at the current location, wherein updating the particular configuration comprises providing a second value of the scan-frequency to operate the LIDAR differently in response to the human-override of the automated-mode.

15. The method in accordance with claim 14, wherein updating the particular configuration includes specifying a second value of a field-of-view to operate the object-detector different from a first value of the field-of-view.

16. The method in accordance with claim 14, wherein updating the particular configuration includes specifying a second value of a frame-rate to operate the object-detector different from a first value of the frame-rate.

17. A vehicle control system, the system comprising:
    an object-detector configured to detect objects proximate to a host-vehicle, the object-detector including a device having a variable frame-rate parameter;
    a location-detector configured to indicate a location of the host-vehicle;
    a configuration-map configured to indicate, from among a plurality of configurations available for the object-detector, a particular configuration applicable to the object-detector for a current location of the object-detector, the particular configuration specifying a first value of the frame-rate to operate the device; and
    a controller-circuit in communication with the object-detector, the location-detector, and the configuration-map, the controller-circuit configured to:
        operate the object-detector in accordance with the particular configuration for the current location of the object-detector in an automated-mode of operating the host-vehicle,
        detect a human-override of the automated-mode of operating the host-vehicle at the current location, and
        in response to the human-override of the automated-mode, update the particular configuration applicable to the object-detector for the current location in accordance with objects detected at the current location, wherein updating the particular configuration comprises providing a second value of the frame-rate to operate the device differently in response to the human-override of the automated-mode.

18. The system in accordance with claim 17, wherein the object-detector includes a device characterized as having at least one parameter that includes a variable field-of- view, the particular configuration in the configuration-map specifies a first value for the field-of-view to operate the device prior to the human-override, and the update to the particular configuration provides a second value for the field-of-view to operate the device differently in response to the human-override of the automated-mode.

19. The system in accordance with claim 18, wherein the first value of the field-of-view is characterized as narrower than the second value of the field-of-view.

20. The system in accordance with claim 18, wherein the first value of the field-of-view is characterized being directed in a first direction, and the second value of the field-of-view is characterized as being directed in a second direction different from the first direction.

* * * * *

UNITED STATES PATENT AND TRADEMARK OFFICE
CERTIFICATE OF CORRECTION

PATENT NO. : 11,143,760 B2
APPLICATION NO. : 15/906059
DATED : October 12, 2021
INVENTOR(S) : Vasudeva Pai Melgangolli et al.

It is certified that error appears in the above-identified patent and that said Letters Patent is hereby corrected as shown below:

In the Claims

Column 7, Line 55, In Claim 4, after "characterized" insert -- as --.

Column 8, Line 57, In Claim 11, after "characterized" insert -- as --.

Column 9, Line 18 (Approx.), In Claim 14, delete "obj ect-detector," and insert -- object-detector, --, therefor.

Column 10, Line 39 (Approx.), In Claim 20, after "characterized" insert -- as --.

Signed and Sealed this
Eleventh Day of January, 2022

Drew Hirshfeld
*Performing the Functions and Duties of the
Under Secretary of Commerce for Intellectual Property and
Director of the United States Patent and Trademark Office*